United States Patent [19]

Barr

[11] Patent Number: 4,697,477

[45] Date of Patent: Oct. 6, 1987

[54] CONTINUOUSLY VARIABLE TRANSMISSION

[76] Inventor: Harold B. Barr, 4957 East Twain Ave., Las Vegas, Nev. 89121

[21] Appl. No.: 630,874

[22] Filed: Sep. 19, 1984

[51] Int. Cl.[4] .......................... F16H 57/10; F16H 1/28
[52] U.S. Cl. ...................................... 74/793; 74/785; 74/804
[58] Field of Search ................. 74/804, 793, 785, 883; 192/4 B, 12 D, 17 C:21.5; 310/77

[56] References Cited

U.S. PATENT DOCUMENTS

| | | | |
|---|---|---|---|
| 2,150,983 | 3/1939 | Murray | 74/785 X |
| 2,180,474 | 11/1939 | Leece | 74/785 |
| 2,508,121 | 5/1950 | McIver | 74/804 |
| 2,549,738 | 4/1951 | Winther | 74/330 |
| 2,575,360 | 11/1951 | Rabinow | 192/21.5 |
| 2,616,019 | 10/1952 | Guillot et al. | 74/785 X |
| 2,666,345 | 1/1954 | Amberg | 74/804 |
| 2,667,089 | 1/1954 | Gregory | 74/751 |
| 2,669,885 | 2/1954 | Fedri | 74/750 |
| 2,709,928 | 6/1955 | Jones | 74/769 |
| 2,737,064 | 3/1956 | Stoeckicht | 74/785 |
| 2,839,943 | 6/1958 | Caldwell et al. | 74/DIG. 10 X |
| 2,916,944 | 12/1959 | Diesfeld | 74/472 |
| 3,129,611 | 4/1964 | Lee | 74/804 |
| 3,160,032 | 12/1964 | Black | 74/804 |
| 3,190,414 | 6/1965 | Maurer et al. | 74/785 X |
| 3,620,335 | 11/1971 | Hendershot et al. | 192/21.5 |
| 3,672,476 | 6/1972 | Hendershot | 192/12 D X |
| 3,783,795 | 1/1974 | Helmer | 74/793 X |
| 4,011,510 | 3/1977 | Olsen | 192/21.5 X |
| 4,183,265 | 1/1980 | Pauley | 74/785 X |
| 4,183,267 | 1/1980 | Jackson | 74/804 |
| 4,184,388 | 1/1980 | Sfredda | 74/793 |
| 4,200,003 | 4/1980 | Miller | 192/21.5 X |
| 4,327,604 | 5/1982 | Evans | 74/751 |
| 4,350,913 | 9/1982 | Eddens | 192/21.5 X |
| 4,567,790 | 2/1986 | Butterfield et al. | 74/804 |

FOREIGN PATENT DOCUMENTS 241873  9/1969  U.S.S.R. ................. 74/793

Primary Examiner—Leslie Braun
Assistant Examiner—Joseph M. Rolnicki

[57] ABSTRACT

A continuously variable transmission with constant torque is designed using an epicyclic gear mechanism with a casing that rotates freely within an electromagnetic braking device. The braking device utilizes magnetic particles filling a gap between the inner diameter of the braking device and the outer casing of the epicyclic gear mechanism such that when the particles are magnetized, they form an adhesive-like resistance to rotation of the epicyclic gear annulus.

2 Claims, 3 Drawing Figures

CONTINUOUSLY VARIABLE TRANSMISSION

BACKGROUND OF THE INVENTION

This invention is relates to a transmission means employing mechanical and electromechanical parts which in proper combination produce a continuously variable output speed.

In conventional transmission systems employing the use of variable diameters of cones, disks and gearing to obtain various speed changes, in selecting the proper speed and torque desired in relation to the power source, a clutch or other mechanism must be provided to permit the engagement of a different gear ratio. Thus, (1) the power source requirements are changed, and (2) a frictional problem is encountered causing a high rate of wear both on contact surfaces and bearing loads. The above problems would be minimized if only one speed were desired, but this is not the case in the majority of transmission applications, such as the automotive industry. Also present are the mechanical problems of engineering and manufacturing intricate machine parts that are required to perform the necessary functions of these mechanisms.

SUMMARY OF THE INVENTION

The object of this invention is to provide a constant torque output and a variable shiftless acceleration of output speed from a given constant source of power. This objective is obtained by a power source with a constant speed at the highest efficient speed and torque. When using this efficient source of power, the transmission will provide all the control of speed required without regulating the input speed or torque. This is accomplished in the present invention by allowing the power source and the transmission to run independent of any change in demand at the output shaft.

When power is required at the output, the transmission may be electromechanically engaged by activating magnetic particles that fill a cavity between the inner diameter of an outer gear case and the annulus of an epicyclic gear connected directly to the input power source. The action of the magnetic particles is not one of contact friction but rather is a series of events wherein the particles form chains that break and reform again. This particle action minimizes the heat build up that would be caused by a friction type clutch.

The improvement over existing types of transmissions is less loss of the input energy and less heat build up, since the input is allowed to run constantly at its most efficient speed, and no friction devices are used in the transmission. To accomplish this, the present invention suspends the entire epicyclic gear assembly, with the input and output shaft bearings designed similar to trunnions, within an outer case of the transmission. The internal diameter of this outer case is designed to form a cavity containing a material controlled by a magnetic field, and forming a variable bond between the annulus of the epicyclic gear and the outer case. Thus, by electromagnetically controlling the rotation of the annulus of the epicyclic gear, the output speed is made continuously adjustable without changing the input speed or torque to the transmission.

DESCRIPTION OF THE PREFERRED EMBODIMENT

Figure 1:
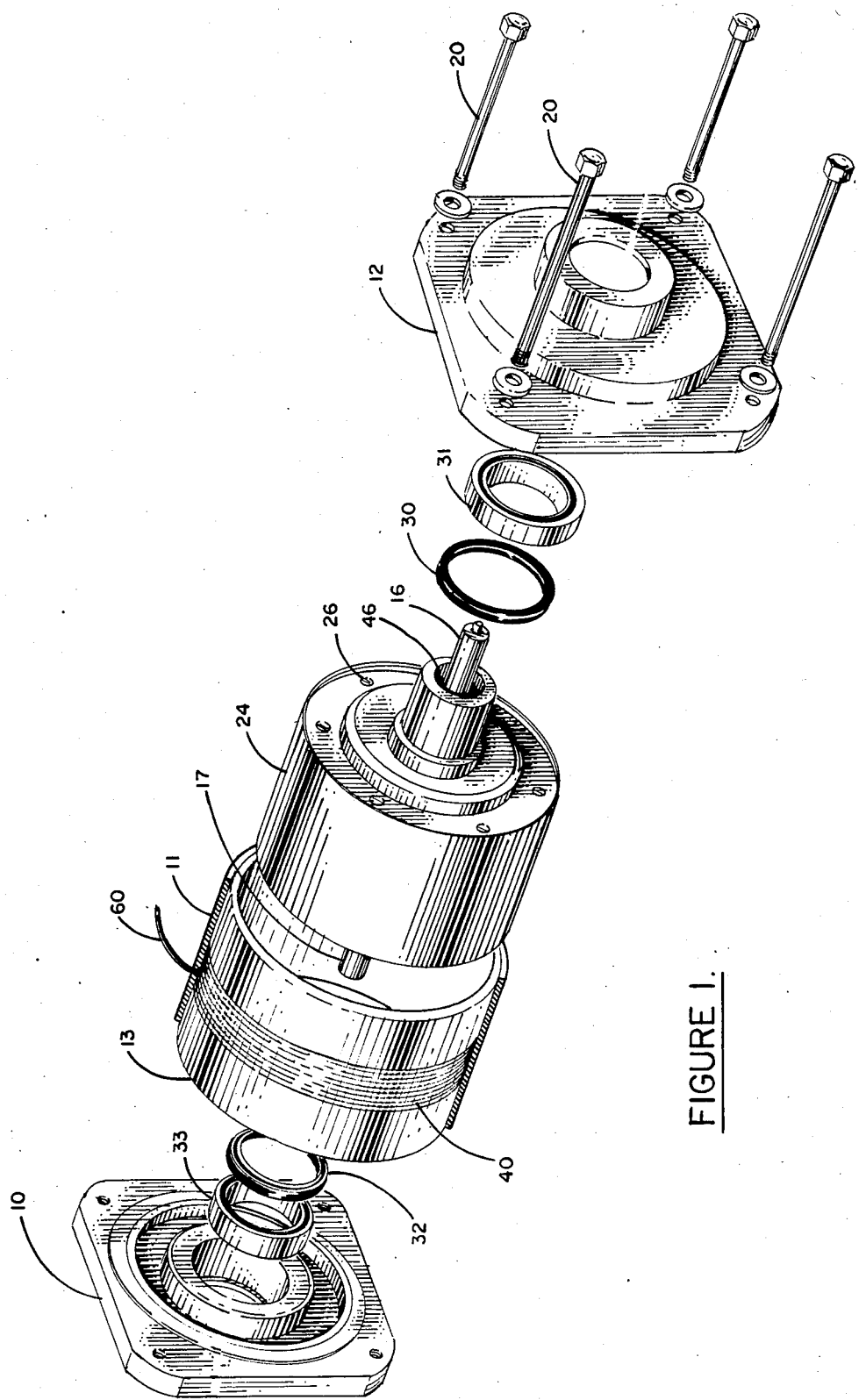
FIG. 1 An exploded view of major assembly parts.

Referring now to the drawings, FIG. 1 is an exploded view of the major components of one embodiment of the present invention, consisting of four major parts: the electrical coil casing (13) with its protective cover (11), the epicyclic gear casing (24), the output end bearing cap (10), and the input end bearing cap (12).

In assembling the transmission, the epicyclic gear assembly (24) is inserted in the interior of the outer case (13). The input bearing (31) is pressed into the input end bearing cap (12) and the output bearing (33) is pressed into the output end bearing cap (10). A magnetic particle gasket input seal (30) and a magnetic particle gasket output seal (32) close the protrusion on the input bearing plate (36) and the output bearing plate (37). The output end bearing cap (10) and the input end bearing cap (12) are held in place with four bolts (20). This forms a closure for the epicycle gear casing (24), the input bearing (31) and the output bearing (33) allowing the epicyclic gear (24) to rotate freely on the interior of the electrical coil casing (13). The input shaft (16) and the output shaft (17) protrude out of opposite ends of assembly.

Figure 2:
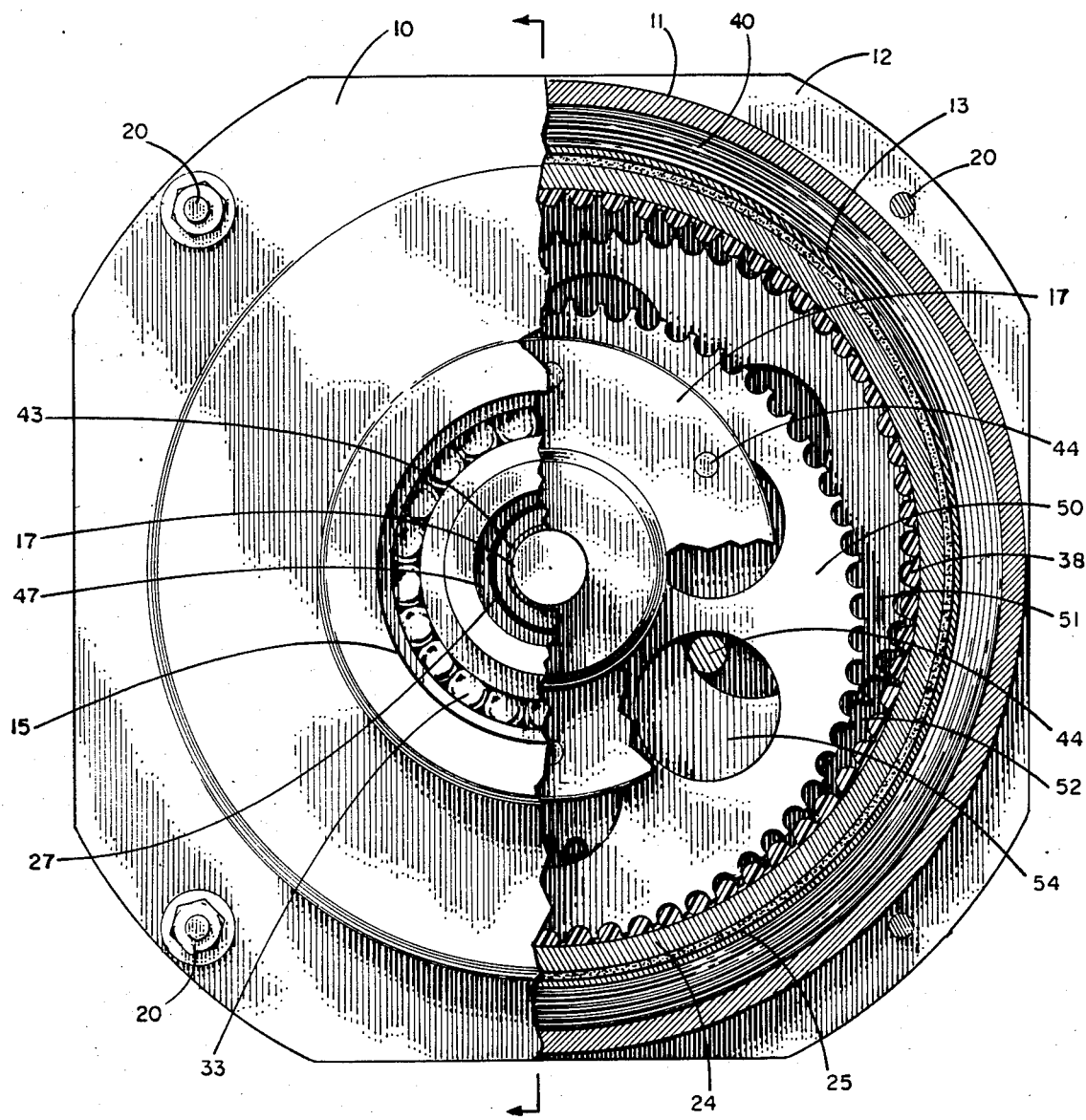
FIG. 2 A view looking at the transmission from the output end and showing a torn away section of the interior.

FIG. 2 shows the orbited path of the epicyclic gears, (50) (51) (52) the ouput shaft (17) and the drive output pin (44). This view shows the basic elements of construction, whereby the positive engagement of the epicyclic gears (50) (51) (52) (which are at an equal spacing of 120 degrees) with the inner toothed surface of the epicyclic gear casing (24) are such that when rotation is applied to the input shaft (16), the cam lobes (53) cause the epicyclic gears (50) (51) (52) to engage in the toothed interior of the epicyclic gear casing (24) and cause it to freely rotate, with the output shaft (17) left stationary. If the toothed surface of the epicyclic gear casing (24) is held stationary or allowed to rotate at a speed less than free rotation, the positive engagement of the epicyclic gears with the inner toothed surface of the epicyclic gear casing (24), will cause the output shaft (17) to rotate.

Figure 3:
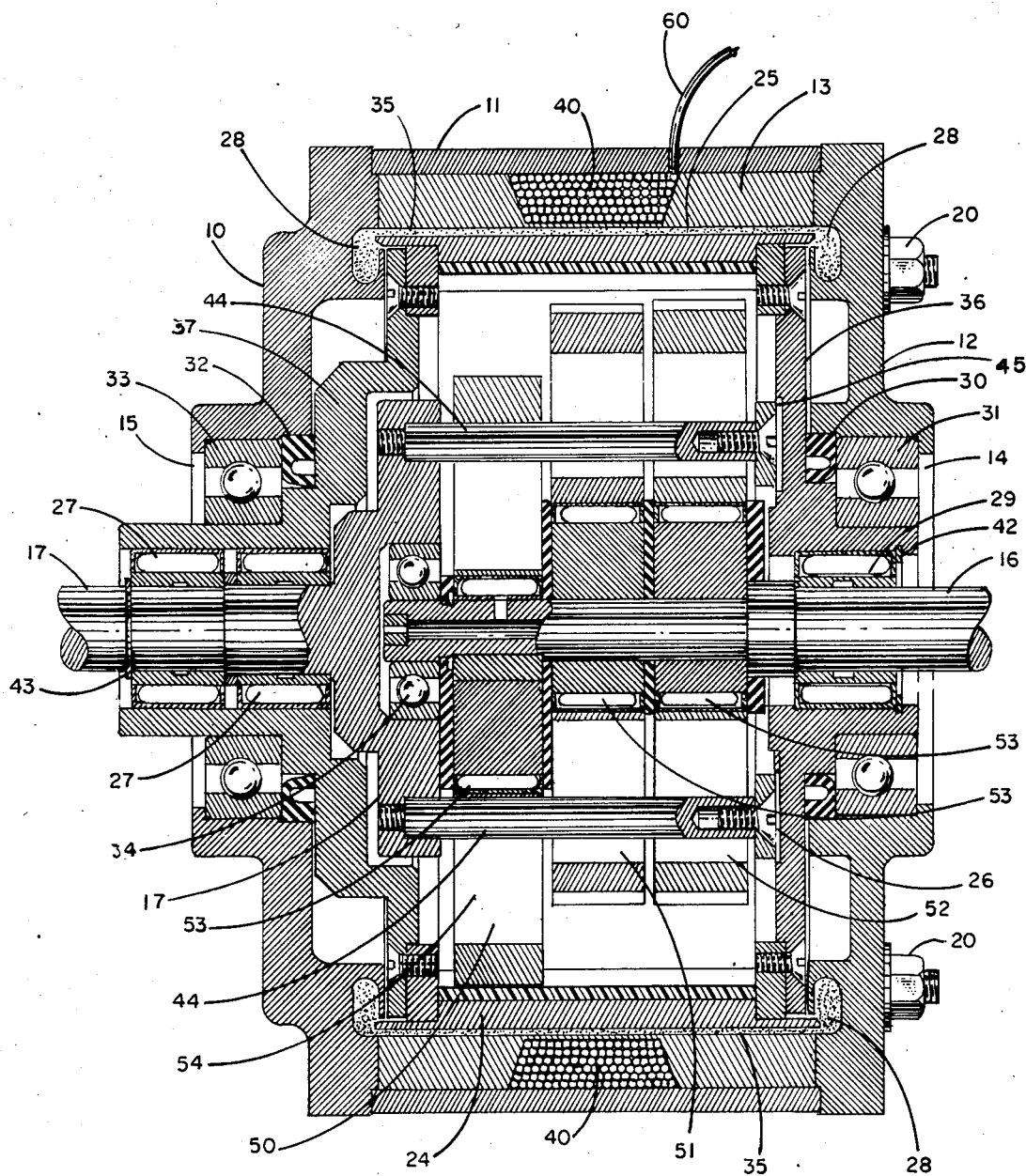
FIG. 3 A sectional view taken from FIG. 2.

In FIG. 3 the input shaft bearing (29) supports input shaft (16) with lockring (42) so that when rotational torque is applied to input shaft (16) the cam lobes (53) (three in number), oriented at 120 degrees to each other, will cause the epicyclic gears (50) (51) (52) to epicycle on the interior of the epicyclic gear casing (24), thus transferring the torque applied at the input shaft (16) to the annulus of epicyclic gear casing (24). The casing rotates in the Magnetic Particle Chamber (25) between the interior diameter of the electrical coil casing (13) and the annulus of the epicyclic gear casing (24). The Chamber (25) is filled with magnetic particles (35). When an electrical current is applied to the electrical leads (60), a magnetic field is built up in the magnetic coil winding (40), the field strength of which will cause the magnetic particles (35) to solidify and effect a braking action between the annulus of the epicyclic gear casing (24) and the internal diameter of the electrical coil casing (13). Depending upon the amount of current applied to the magnetic coil winding (40), the annulus of the epicyclic gear casing (24) will be allowed to rotate freely, or will be allowed to rotate at a speed less than free rotation, or will be brought to a complete stop. When all rotation of the annulus of the epicyclic gear casing (24) is halted the effective torque of the input shaft (16) is transferred through the epicyclic gears (50) (51) (52) to the drive pins (44) which follow an orbital path of a drive pin orbit race within the drive pin orbit race openings (54) within the epicyclic gears, and transfer the torque applied at the input shaft (16) to the output shaft (17). The output shaft (17) is supported by two output shaft bearings (27) inserted in the output end bearing cap (10) with an external lockring (43) to control end play. The drive pin end plate (45) is held in place with precision screws (26) to provide maximum torque capacity when being driven.

What is claimed is:

1. A continuously variable transmission means for creating an adjustable speed constant torque output from a constant speed input, said transmission means comprising an epicyclic gear casing, consisting of an input shaft having a plurality of eccentric cam lobes thereon with said cam lobes being disposed of at an equal angular spacing from each other, a plurality of epicyclic toothed gears arranged concentric with and freely rotating on each of said cam lobes and containing a plurality of drive pin orbit race openings, an interior casing surface having a greater number of teeth than said epicyclic toothed gears and with said epicyclic toothed gears having a plurality of teeth in mesh with said interior casing surface and able to epicycle on said interior casing surface in response to rotation of said cam lobes, an output shaft to which a plurality of drive pins are attached parallel to the axis of said output shaft with said drive pins following an orbital path in said drive pin orbit race openings when said epicyclic toothed gears epicycle on said interior casing surface, and a magnetic particle chamber, consisting of an electrical coil casing surrounding said epicyclic gear casing with electrical leads attached to said electrical coil casing, two opposing end bearing caps attached to said electrical coil casing forming an enclosed cavity portion between the peripheral surface of said epicyclic gear casing and the interior surface of said electrical coil casing, and with said output shaft and input shaft of said epicyclic gear casing extending through said end bearing caps such that said epicyclic gear casing may freely rotate within said cavity, and including magnetic particles in said enclosed cavity portion, said magnetic particle chamber providing a continuously variable braking action on said epicyclic gear casing in response to a variable electrical current applied to said electrical leads.

* * * * *